United States Patent [19]

Lick

[11] 4,335,913
[45] Jun. 22, 1982

[54] CEILING TILE REPLACING AND POSITIONING APPARATUS

[76] Inventor: George R. Lick, 106 Harrison St., Emmaus, Pa. 18049

[21] Appl. No.: 186,326

[22] Filed: Sep. 11, 1980

[51] Int. Cl.³ .............................................. B25J 1/00
[52] U.S. Cl. .................................................. 294/19 R
[58] Field of Search ................... 294/19 R, 20, 22–24, 294/27 R, 32, 53.5, 61; 15/144 R; 52/122, 126, DIG. 1; 403/103

[56] References Cited

U.S. PATENT DOCUMENTS

| | | | |
|---|---|---|---|
| 1,468,878 | 9/1923 | Donald | 294/22 |
| 1,833,120 | 11/1931 | Nitzscke | 294/22 |
| 3,090,984 | 5/1963 | Dunnigan | 294/19 R X |
| 4,019,769 | 4/1977 | Filion | 294/19 R |
| 4,261,607 | 4/1981 | Pilcher | 294/19 R |

Primary Examiner—Johnny D. Cherry
Attorney, Agent, or Firm—Ruth Moyerman

[57] ABSTRACT

A ceiling tile replacing and positioning apparatus is disclosed in which a frustum-shaped frame is provided. An encircling flange on the larger base end of the frustum provides a platform upon which the ceiling tile may be rested. Pins project perpendicular to the flange to hold the tile in place. A handle including a sleeve which is pivotally and releasably attached to the frustum-shaped frame at the frustum smaller base makes the apparatus usable from various angles.

6 Claims, 4 Drawing Figures

CEILING TILE REPLACING AND POSITIONING APPARATUS

BACKGROUND OF THE INVENTION

1. Field of the Invention

This invention relates to handling, hand and hoist-line implements and more particularly to ceiling tile removers.

2. Description of the Prior Art

In the building and renovating of commercial structures such as offices, stores and restaurants, including public areas, much attention is being given to the installation of what are called "suspended" ceilings. A suspended ceiling is one in which a grid system of inverted "T"-shaped brackets are suspended by wires from the structural materials or surfaces above. Ceiling tiles of any number of sizes, and typically about 2 ft.×4 ft. in dimension, are inserted upward from below the grid system through the opening created by the removal of the ceiling tile to be replaced. The end result is a lower labor cost to replace soiled or damaged ceiling tiles in the existing ceiling system.

The tiles themselves are made of a variety of materials including pressed fiber, plastics of all kinds, or any other materials which provide a decorative, soundproof or whatever end result is desired.

The installation of the ceiling tiles themselves into the grid system, or their positioning, or removal, can be difficult or arduous because the average ceiling height is generally ten feet and upward in most commercial structures. For the maintenance personnel who must clean or replace tile but do not have the tall ladders or scaffolding available to a contractor, working with ceiling tile is particularly difficult. Furthermore, in many areas of the country, the original installation of a suspended ceiling is undertaken by a qualified ceiling contractor. Thus, original installation as well as tile replacement involves the use of ladders or scaffolding which must be moved at frequent intervals to enable the installer to reach the entire ceiling area.

There is therefore a great need for an apparatus for the replacement of ceiling tile associated with a suspended ceiling. The apparatus should be easy to operate by one of only ordinary strength. It should further be simple in construction and operation, inexpensive to manufacture and adaptable to most types of tile construction.

SUMMARY OF THE INVENTION

The foregoing prior art problems are solved by the apparatus of this invention.

The apparatus of this invention includes a generally hollow frustum-shaped frame. The larger base of the frame has an outwardly extending flange which encircles the base and it is on this flange that the tile is intended to be rested. A plurality of pins protrude generally perpendicular from the frame and these pins skewer the tile to hold it on the frame while the tile is being dismounted, or mounted into place. The smaller base end of the frustum is adapted to receive a handle, preferably a telescoping pole.

In the preferred embodiment, the frame includes an indented or depressed portion on one set of opposing faces of a four-sided frustum. Bolt means pass through a sleeve end and secure the sleeve to the small end of the frame through the depression walls. On one of the depression's sides, an angle adjusting arm is pivotally secured to the bolt and, at its other end, includes a detent. The detent may be popped into various apertures set along an arc on the depression wall. The user, by selecting the aperture along the arc into which the detent is popped or placed, determines thereby the angular relationship between the pole and the frame member. Thus a user of the apparatus stands directly under the ceiling tile work area, in which case the frame would be adjusted so that the tile would be held on the flanges generally perpendicular to the sleeve. In those instances in which the user is not standing directly under the work area, but must reach forward or to the side to reach the work area, a simple adjustment through the angle adjustment arm and detent will enable the user to maintain the tile at the correct angle to insert the tile into the grid system.

In operation, a tile is placed on the flanged portion and held thereby with the pins while the user lifts the assembly through the opening created by the previous removal of the tile and positions the new tile in place in the grid system. A simple downward pull will disengage the frame from the tile, leaving the tile positioned correctly in place in the ceiling grid system.

It is therefore an object of this invention to provide an apparatus which may readily and conveniently be used to remove, position or reposition ceiling tiles of the type associated with suspended ceilings.

It is also an object of this invention to provide an apparatus which is simple in operation and adaptable to most kinds of suspended ceiling construction.

It is a further object of this invention to provide such a device which is lightweight, easy to assemble and adjust for normal maintenance procedures.

These and other objects will be more readily ascertainable to one skilled in the art from a consideration of the figures and following description and exemplary embodiments.

DESCRIPTION OF THE PREFERRED EMBODIMENT(S)

Figure 1:
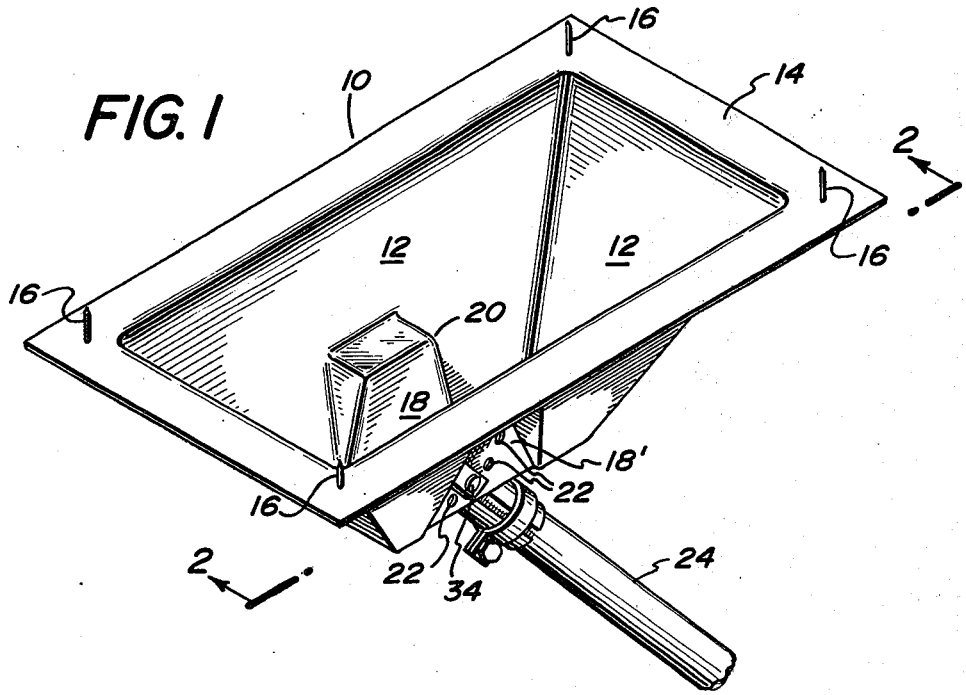
FIG. 1 represents a fragmentary perspective of an embodiment of the apparatus of this invention.

Referring now to the drawings, and more particularly to FIG. 1, the ceiling tile removing and positioning apparatus of this invention is shown including frame 10. Frame 10 is shown as a generally hollow frustum shape. The frustum in this particular view has four sides 12. Sides 12 end in an outwardly extending flange 14 which encircles the frame at what would be its larger base end. In each of the four corners formed by flange 14, pins 16 are shown protruding generally perpendicularly from the flange. In FIG. 1, depressions 18 and 18' are shown in one set of opposing sides 12. Depressions 18 and 18' include a generally flat sided back portion 20 whose purpose will be explained in relation to subsequent Figures. Depression 18' is shown including apertures 22. FIG. 1 also includes a view of handle means 24.

Figure 2:
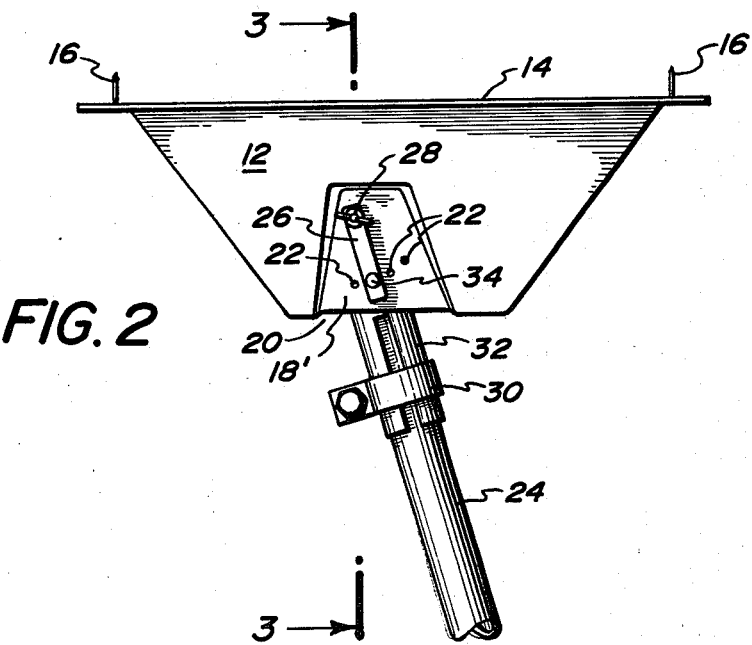
FIG. 2 shows an elevation taken on lines 2—2 of FIG. 1.

Referring now to FIG. 2 which is a side elevation taken along lines 2—2 of FIG. 1, depression 18' is shown more clearly from the exterior view. In FIG. 2 both angle adjustment arm 26 and bolt means 28 are more clearly visible. Bolt means 28 connects handle means 24 through sleeve 32 and band 30 to frame 10 through depressions 18 and 18'. Angle adjustment arm 26 is pivotally connected to the whole assembly also by bolt means 28. Angle adjustment arm 26 ends in a detent, not clearly shown in this Figure, which fits into apertures 22.

Figure 3:
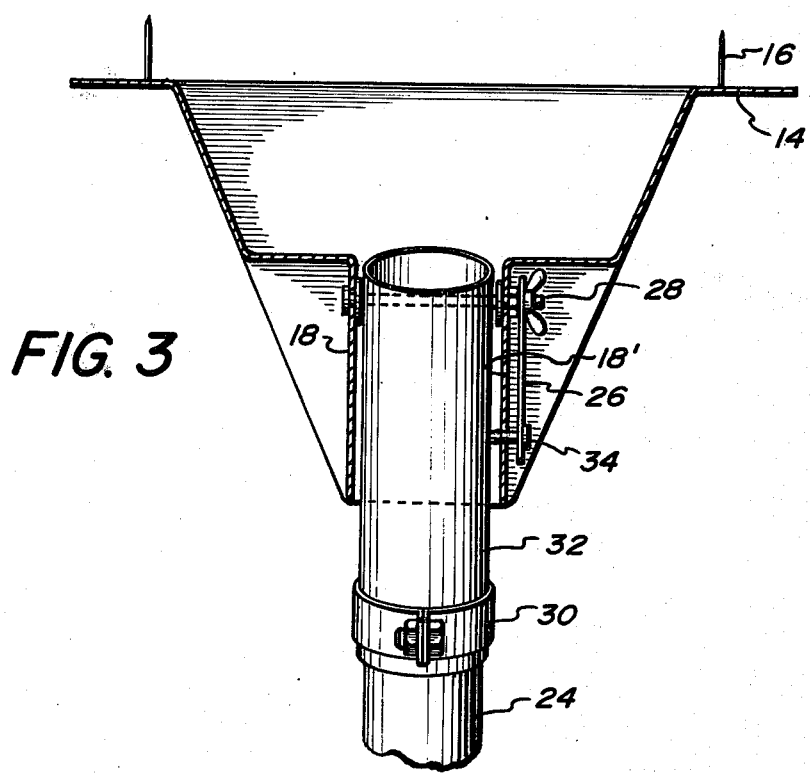
FIG. 3 shows a cross section taken on lines 3—3 of FIG. 2.

Referring now to FIG. 3, a cross section taken on lines 3—3 of FIG. 2 is shown. In FIG. 3, the inter-relationship between frame 10 and handle means 24 is shown more clearly. Sleeve 32 is shown disposed between depressions 18 and 18'. Bolt means 28 secures sleeve 32 and also angle adjustment arm 26. Detent 34 is clearly shown in this view inserted into one of apertures 22 and into sleeve 32.

Figure 4:
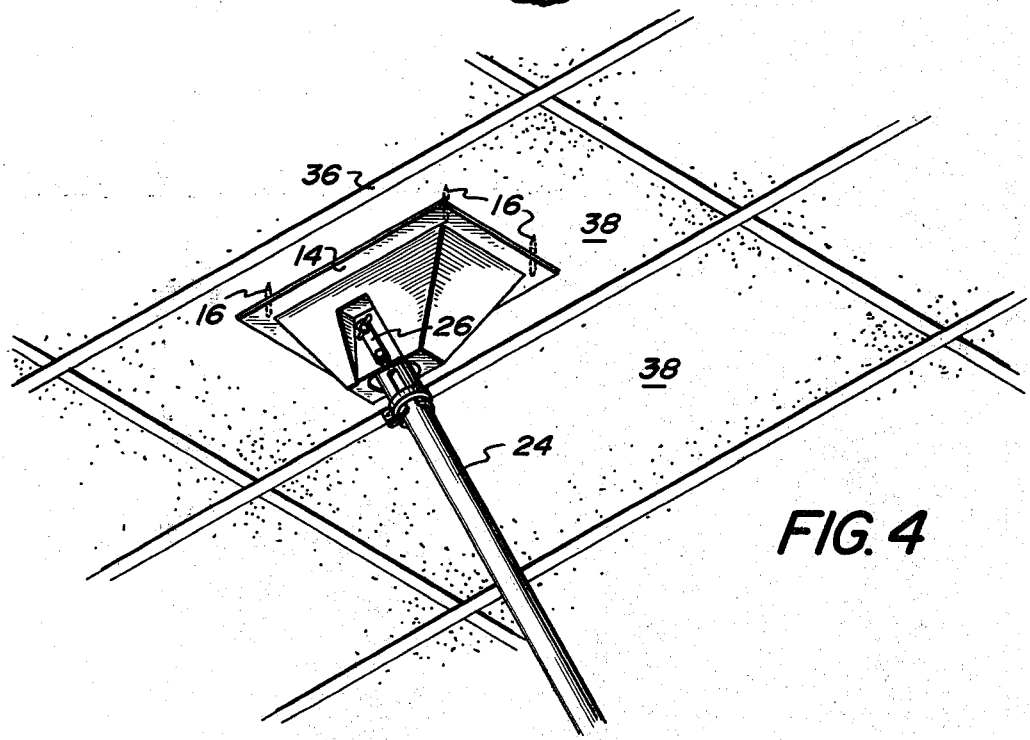
FIG. 4 is a perspective view showing the apparatus as it would be used in practice.

Referring now to FIG. 4, a view is shown of the apparatus of this invention as it might appear in use. Ceiling grid system 36 is shown as it would appear mounted from the view of the user. Tiles 38 are shown in place and the apparatus of this invention is shown skewered through pins 16 to a tile 38. In this view, the manner in which tile 38 would rest on the platform formed by flange 14 may be seen. FIG. 4 also illustrates the adaptability of the device of this invention in that it may be appreciated that the adjusting of the angle at which frame 10 forms with handle means 24 is important. The ceiling in question is of some height over the normal reach of one seeking to replace ceiling tiles. If the person is standing directly under the ceiling, then angle adjusting arm 26 would be fixed by detent 34 so as to make the frame and handle means at generally right angles to each other. But, if the user must stand to one side so that the ceiling tile is not directly overhead, then the ability to adjust the angular relationship between frame and handle means so as to keep the frame parallel to the ceiling tile becomes very important. The apparatus of this invention allows this adjustment to be made simply and quickly.

There are variations which may be practiced within the scope of this invention. While a four-sided frustum has been illustrated, it should be appreciated that the number of sides to the frustum is generally a matter of choice. The frustum may even be conical or triangular, for example. What is important is to provide a flange at the larger base end which is to form the platform upon which the tile is to rest.

It is also not critical for this invention that depressions 18 and 18' be included. However, as is illustrated, the depressions make the attachment of the frame to the handle means a great deal simpler. Furthermore, a flat wall 20 of the depression is likewise helpful.

Sleeve member 32 is shown detachable from the hand held portion of the handle means and both are illustrated as circular in cross section. This is likewise a convenience and other configurations may be satisfactory.

The material of construction is also optional and it is not necessary for the frustum to be hollow, although a hollow construction reduces the weight considerably and thus makes the device easier to use.

The materials of construction of this device are preferably, but not necessarily, plastic for the frame member and wood or metal for the handle means. A telescoping handle means is optional, but would provide much more versatility of application for the apparatus.

Finally, the number, positioning and size of pins 16 may vary so long as their size, position and number allows the tile to be pinned without damage.

Having now illustrated my invention it is not my intention that such illustration be limiting to the invention, but that the invention be limited only by a reasonable interpretation of the appended claims.

What is claimed is:

1. An apparatus for positioning, removing and replacing ceiling tile comprising:
   (a) a generally frustum-shaped frame, including a small and large base, said frustum wall of which includes a pair of depressions in opposed relationship proximate said frustum smaller base, said frustum's larger base terminating in an outwardly projecting encircling flange, said flange forming a platform on which ceiling tile may rest;
   (b) a plurality of pins protruding generally perpendicular from said flange whereby said tile may be releasably skewered to said flange; and,
   (c) handle means mounted to said frame at said frame smaller base, said handle means including a sleeve member pivotally disposed between and secured to said frame through said depression walls.

2. The apparatus according to claim 1 wherein said frustum is four sided.

3. The apparatus according to claim 1 wherein said sleeve member is secured to said frame depression walls by releasable bolt means, and said securing means further including:
   (a) an angle adjustment arm, one end of which is interconnected with said bolt means along one of said depression walls;
   (b) a detent attached to said angle adjustment arm's other end; and,
   (c) a plurality of apertures spaced apart along an arc on said depression wall adapted to receive said detent so that the angle as measured between the frame and sleeve may be varied according to the aperture into which the detent is placed.

4. The apparatus according to claim 1 wherein said handle means comprises telescoping cylindrical members intended to be hand held by one standing below the work area.

5. The apparatus according to claim 1 wherein said frame is molded plastic.

6. The apparatus according to claim 1 wherein said frustum is generally hollow.

* * * * *